July 24, 1956  J. L. WHITMORE  2,755,723
VERTICALLY ADJUSTABLE PLOW
Filed Dec. 29, 1950  5 Sheets-Sheet 5
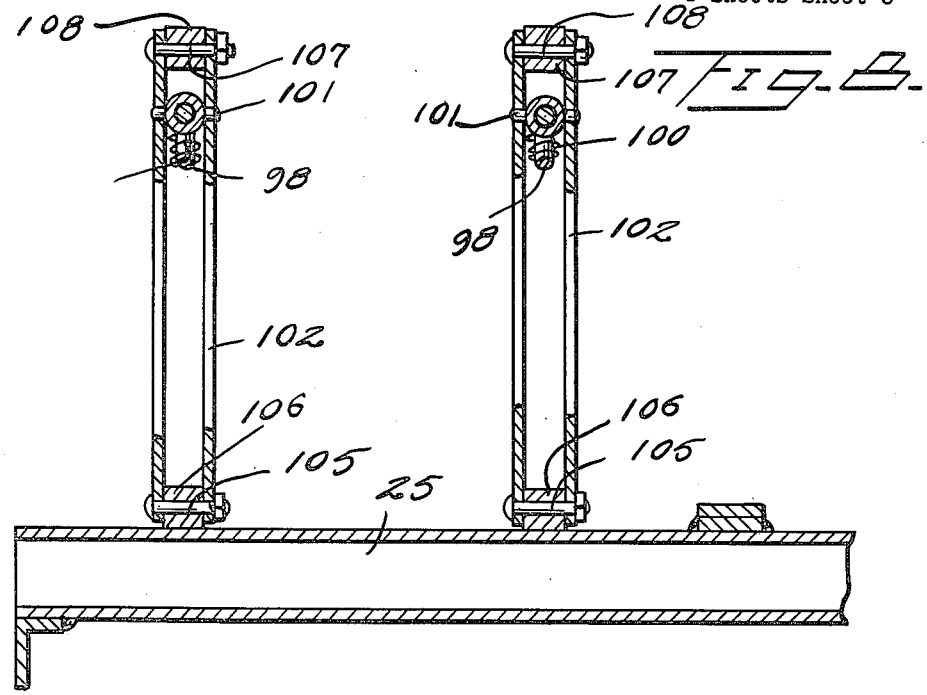
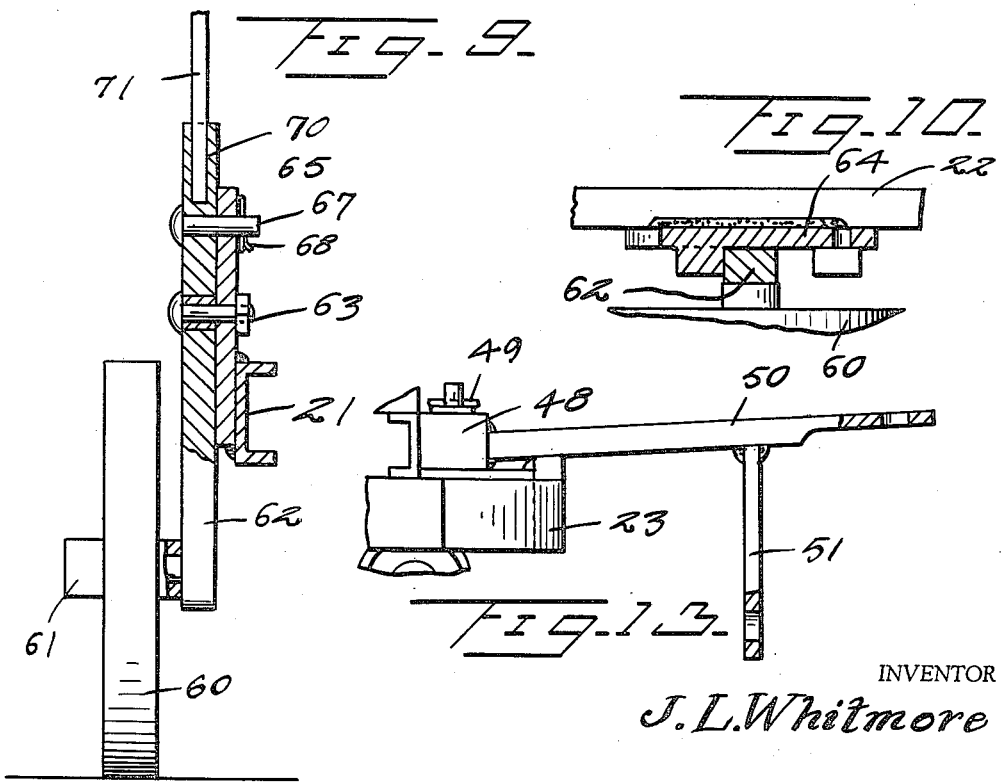
INVENTOR
J. L. Whitmore
BY Kimmel & Crowell
ATTORNEYS

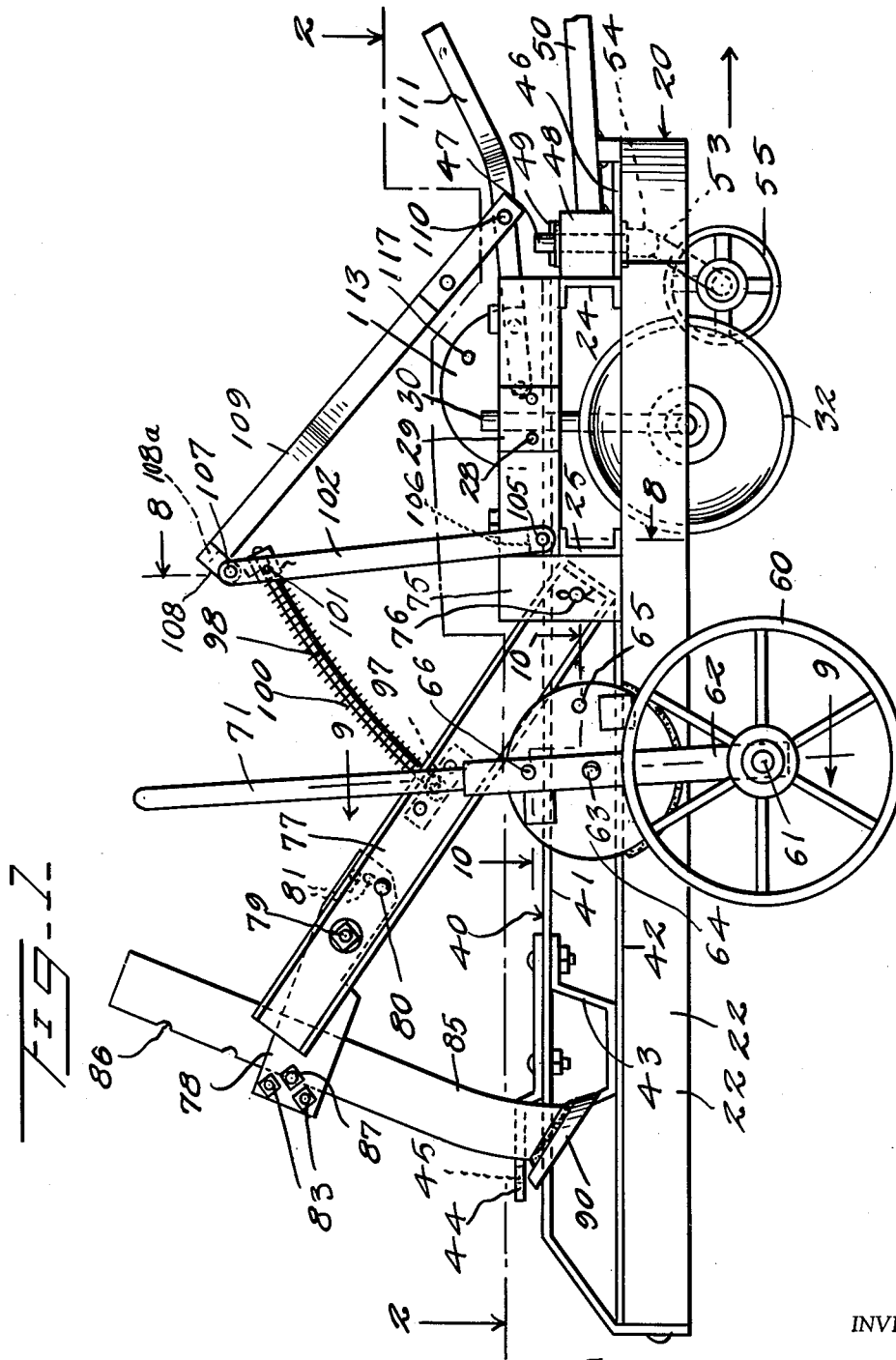

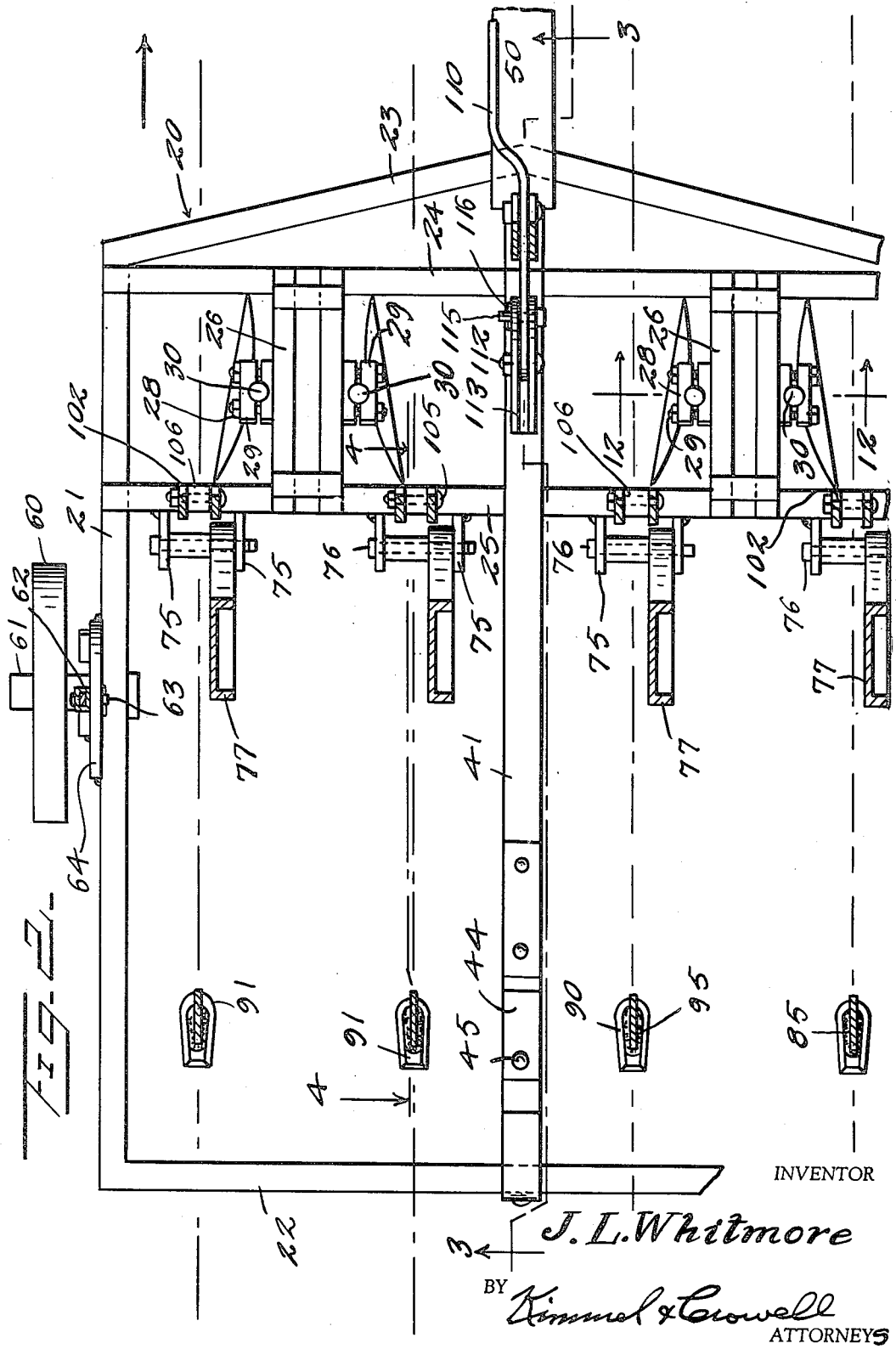

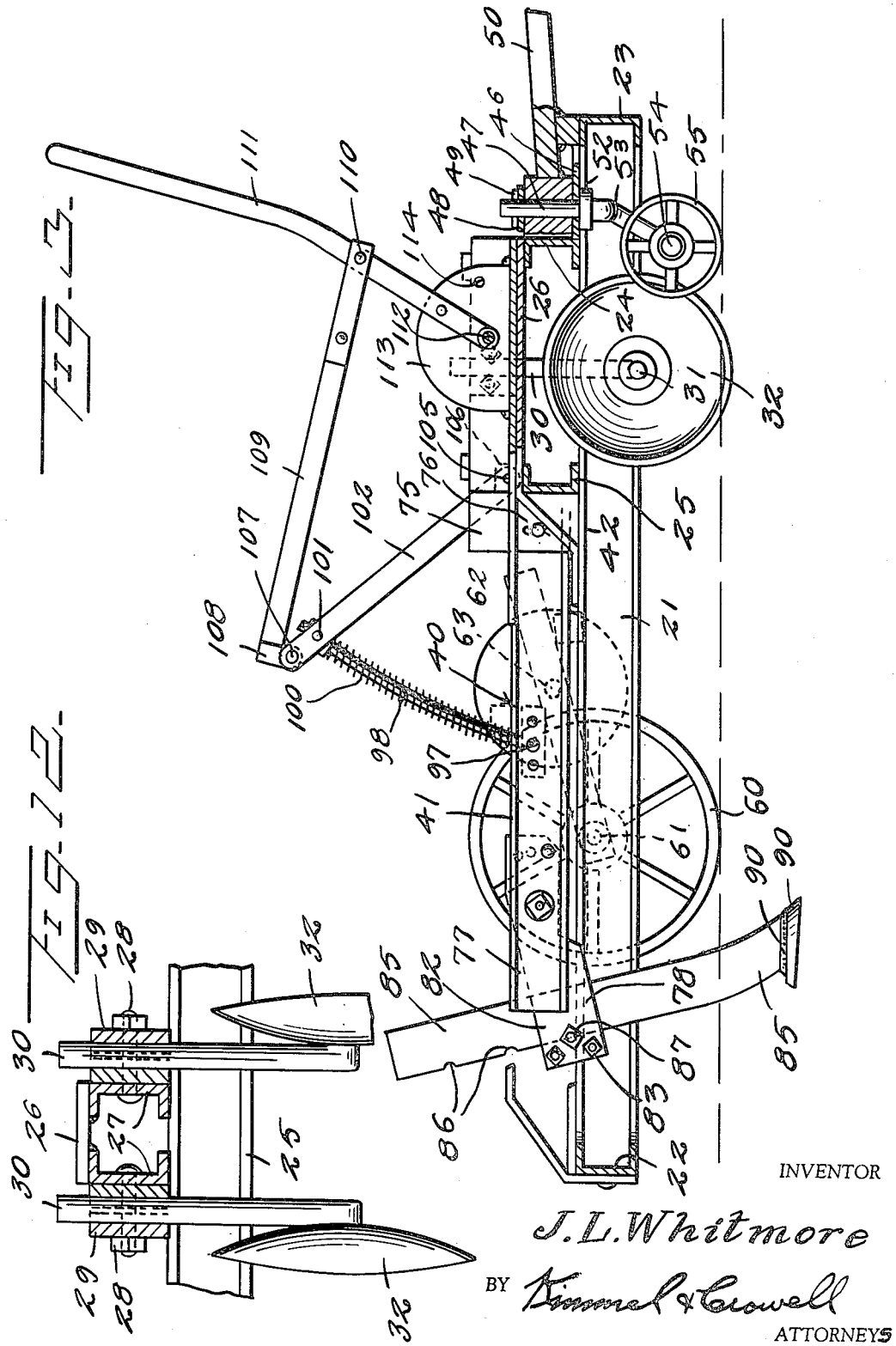

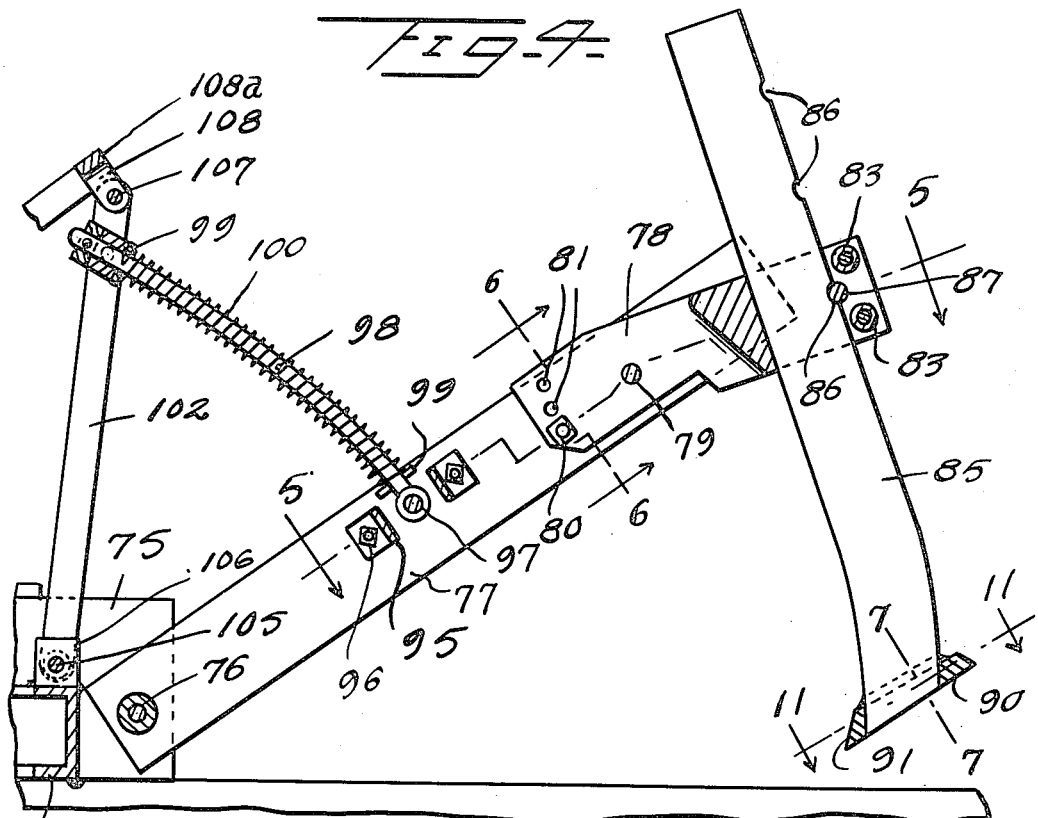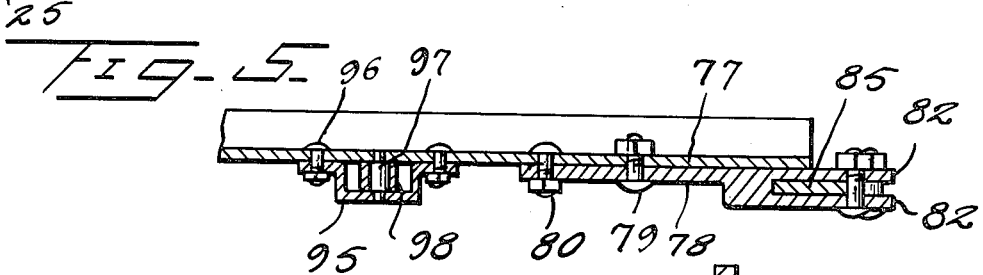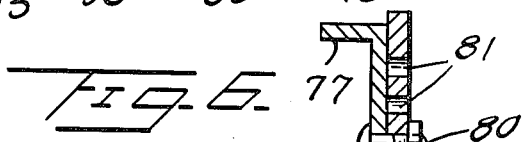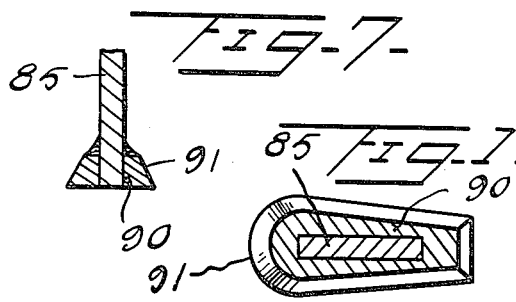

United States Patent Office 2,755,723
Patented July 24, 1956

2,755,723
VERTICALLY ADJUSTABLE PLOW

John Lester Whitmore, Berwyn, Md., assignor to The National Metropolitan Bank, Washington, D. C., as trustee Application December 29, 1950, Serial No. 203,440

1 Claim. (Cl. 97—91)

This invention relates to a plow and, more particularly, to a multiple type plow carried by a wheeled frame.

An object of the invention is the provision of such a plow characterized by a multiplicity of plow blades provided with means whereby the relative depth of the plowing operation may be varied by suitable adjustment of the blade carrying members.

An additional object of the invention is the provision of an improved wheeled frame characterized by means whereby the frame may be raised and lowered relative to the ground level.

Still other objects reside in the combination of elements, arrangements of parts, and details of construction, all of which will be more fully pointed out hereinafter and shown in the accompanying drawings wherein there is disclosed a preferred embodiment of this inventive concept.

In the drawings:

Figure 1 is a side elevational view of one form of device embodying features of the instant inventive concept shown in raised position, certain concealed elements thereof being shown in dotted lines, Figure 2 is a sectional view taken substantially along the line 2—2 of Figure 1, as viewed in the direction indicated by the arrow, Figure 3 is a sectional view taken substantially along the line 3—3 of Figure 2, as viewed in the direction indicated by the arrows, the view being similar to Figure 1, but showing the plow elements in a different position of adjustment, Figure 4 is an enlarged sectional view taken substantially along the line 4—4 of Figure 2, as viewed in the direction indicated by the arrows, Figure 5 is an enlarged sectional view taken substantially along the line 5—5 of Figure 4, as viewed in the direction indicated by the arrows, Figure 6 is a sectional view taken substantially along the line 6—6 of Figure 4, as viewed in the direction indicated by the arrows, Figure 7 is a sectional view taken substantially along the line 7—7 of Figure 4, as viewed in the direction indicated by the arrows, Figure 8 is an enlarged sectional view taken substantially along the line 8—8 of Figure 1, as viewed in the direction indicated by the arrows, Figure 9 is a sectional view taken along the line 9—9 of Figure 1, as viewed in the direction indicated by the arrows, Figure 10 is a sectional view taken substantially along the line 10—10 of Figure 1, as viewed in the direction indicated by the arrows, Figure 11 is an enlarged sectional view taken substantially along the line 11—11 of Figure 4, as viewed in the direction indicated by the arrows, Figure 12 is an enlarged fragmentary sectional view taken substantially along the line 12—12 of Figure 2, as viewed in the direction indicated by the arrows, Figure 13 is a fragmentary enlarged detail view partially in section, showing a further constructional detail.

Similar reference characters refer to similar parts throughout the several views of the drawing.

Having reference now to the drawings in detail, the construction of the instant invention comprises a horizontally positioned frame generally indicated at 20, of rectangular configuration, which includes side members 21, a transverse rear member 22, and a V-shaped front member 23. Transversely extending front and rear reinforcing members 24 and 25 are also provided.

Extending between members 24 and 25 and on opposite sides thereof, are a pair of strap members 26, each of which is provided as best shown in Figure 12 with a pair of side walls comprised of channel irons 27 to each of which is secured as by means of bolts 28, a bushing 29, provided with a vertical bore through which extends a rod 30. Rotatably secured to each of rods 30 as by mounting on an axle 31 is a disc harrow member 32. The disc harrows 32 carried by each strap member 26 are in oppositely disposed relation as best shown in Figure 12.

A centrally positioned longitudinally extending reinforcing member generally indicated at 40 is also provided, and includes upper and lower members 41 and 42, respectively, spaced apart at their rear extremity by a U-shaped bracket 43. The upper member 41 carries at its rear end an offset strap iron 44 provided with an aperture 45 through which a bolt may be positioned to permit towing of the apparatus rearwardly.

At its forward end member 40 is extended over reinforcing members 24 and 25, and thence downwardly as at 46 to the apex of V-shaped forward member 43. A bolt or pivot 47 extends through a suitable aperture therein and serves as a mounting for a bushing 48, a cotter pin 49 securing the parts in related assembly. Bushing 48 has secured thereto a towing tongue 50, adapted for connection of the device to a suitable tractor or the like. A vertical supporting member 51 is suitably welded to the underside of the tongue 50 for supporting the same in proper relationship for connection to a towing vehicle. (See Figure 13.) Beneath member 46 there is positioned a collar 52 comprising an integral part of pin 47 beneath which extends an offset member 53 which is re-offset to form an axle 54 upon which is mounted a suitable guide wheel 55.

The frame is adapted to be supported at an intermediate point on main supporting wheels 60 mounted on stub axles 61 carried by bars 62 pivotally connected as by pivots 63 to discs 64 which in turn are secured to the side frame members 21. Each disc is provided with two or more apertures 65, while the bar 62 is provided with an aperture 66 adapted selectively with one of the apertures 65. With the parts in the position shown in Figure 1, a bolt 67 is adapted to be passed through aperture 66 and the uppermost of aperture 65 and held in position by a cotter pin 68 (see Figure 9).

When it is desired to lower the frame to the position indicated in Figure 3 for plowing the entire frame may be lowered by removal of the cotter pin and positioning it in the lowermost radially positioned aperture 65 thus lowering the entire frame while still permitting the engagement of the wheels with the ground to support the same. The upper end of each member 62 is provided with a socket 70 in which may be positioned a handle 71 to facilitate the movement of the wheels from raised to lowered position or vice versa.

As best shown in Figures 2 and 3 the rear of transverse reinforcing member 25 is provided with a plurality of pairs of spaced plates 75 between each pair of which extends a pivot 76 upon which pivots are mounted channel iron members 77 which are held upwardly at an angle as best shown in Figure 1 when the plow points are in raised position. Each member 77 carries at its end a plate 78 pivotally secured thereto as by a pivot pin 79 and adapted for angular relation relative to the member 77, the latter being provided with a single aperture through which is passed a bolt 80 while plate 78 is provided with a plurality of apertures 81 in which the bolt 80 may be selectively engaged. The outer end of plate 78 is as best shown in Figure 5 bifurcated to form legs 82, provided with a pair of aligned apertures through which are adapted to be extended clamping bolts 83.

Between the bifurcations 82 the shank 85 of a plowshare is adapted to be passed. Each shank 85 is provided with a plurality of notches 86 in which is adapted to be positioned selectively a bolt 87 passed through an aperture in the bifurcations 82 whereby the relative depth of the plow cut may be readily varied.

As best shown in Figures 7 and 11 the lower portion of plow shank 85 is provided with a plow point 90 of generally horseshoe configuration, bevelled downwardly as indicated at 91 to provide a relatively sharp cutting edge about the entire periphery thereof.

Suitable means are provided for raising and lowering the plow points between the relative positions of Figure 1 and Figure 3 and take the form as most clearly shown in Figures 5 and 6 of brackets 95 secured as by bolts 96 to an intermediate point of each member 77, the bracket serving to retain a pivot 97 upon which is positioned one end of an arcuate rod 98 provided at each end with collars 99 against which abut the ends of a coil spring 100.

The opposite ends of arcuate rod members 98 are pivotally secured as by pivots 101 between spaced plates 102. The lower ends of each pair of plates 102 are pivotally secured as by means of pivot pins 105 to lugs 106 carried by the upper side of transverse reinforcing member 25.

The upper end of each pair of plates or bars 102 is provided with a bolt 107 which serves as a pivot for a lug 108 extending downwardly from a transversely extending operating bar 108a, to which is secured a pair of converging operating bars 109 which extend forwardly and are pivotally connected as by a pivot 110 to an operating lever 111. The operating lever 111 is pivotally connected as on a bolt 112 constituting a pivot which is positioned by the quadrants 113 (see Figures 2 and 3), the quadrants in turn being positioned on upper member 41 of transverse reinforcing bar.

Each quadrant 113 is provided with two apertures 114 adapted to be selectively placed in registry with a single aperture in the lower portion of operating handle 111. The operating handle and its associated mechanism are adapted to be held in one of two selected positions as by a bolt 115 (see Figure 2) and cotter pin 116. Obviously, in one of such positions the plow blades through the linkage and leverage previously described will be held in raised position as shown in Figure 1, and in the other of such positions they will be held in lowered position as best shown in Figure 3.

From the foregoing the operation of the device should now be readily understandable. When it is desired to transport the device from place to place the wheels are lowered as shown in Figure 1 and the plow plates raised whereupon the frame assembly may be towed from place to place. Through the linkage previously described the plow plates may be lowered to the position shown in Figure 3, and the wheels raised similarly as shown in Figure 3, and the device is ready for plowing.

Obviously the angularity of the plowshare may be varied by angular adjustment of the plate 78 in a manner previously described and the depth of the furrow may be governed by means of the bolt 87 and the notches 86 also previously described.

From the foregoing it will now be seen that there is herein provided an improved plowshare which accomplishes all the objects of this invention and others including many advantages of great practical utility and commercial importance.

As many embodiments may be made of this inventive concept and many modifications may be made in the embodiment hereinbefore shown and described, it is to be understood that all matter herein is to be interpreted merely as illustrative and not in a limiting sense.

I claim:

Means for raising and lowering a plurality of earthworking implements carried by a wheeled frame, said means including a pair of plates fixed one to each side of said frame, a pair of levers disposed one on each side of said frame, a pivotal connection between each of said levers and its associated plate, each plate having a plurality of keeper openings on a radius to said pivot means, a pin extending through each lever and engageable in a selected keeper opening whereby said frame may be secured in raised or lowered position relative to the wheels thereof, a plurality of earthworking implements, a supporting lever for each implement, means pivotally mounting each implement on its associated lever, keeper means for securing each implement in a selected position relative to its associated lever, an operating lever pivoted to said frame, an arcuate connecting rod extending from each supporting lever, a transverse member extending across said frame and slidably connected relative to the opposite end of each connecting rod, compression springs surrounding each rod, a connection between said operating lever and said transverse member, a hand lever, a link pivotally connected at one end to said hand lever and pivotally connected at its other end to said operating lever, a quadrant having a plurality of apertures therein adjacent said hand lever, and pin means carried by said hand lever engageable in a selected one of said last-mentioned apertures for holding said earthworking implements in raised or lowered position.

References Cited in the file of this patent

UNITED STATES PATENTS

| | | |
|---|---|---|
| 347,722 | Krause | Aug. 17, 1886 |
| 451,254 | Barton | Apr. 28, 1891 |
| 626,822 | Baseman | June 13, 1899 |
| 666,961 | Funk | Jan. 29, 1901 |
| 821,979 | Bjorklund | May 29, 1906 |
| 877,470 | Ferriott | Jan. 21, 1908 |
| 1,013,298 | Kuhns | Jan. 2, 1912 |
| 1,248,271 | Crane | Nov. 27, 1917 |
| 1,290,446 | White | Jan. 7, 1919 |
| 1,413,353 | Phillips | Apr. 18, 1922 |
| 1,459,393 | Gardiner | June 19, 1923 |
| 2,091,427 | Brodersen | Aug. 31, 1937 |
| 2,601,653 | Wolfe | June 24, 1952 |

FOREIGN PATENTS

| | | |
|---|---|---|
| 1,081 | Great Britain | A. D. 1859 |